July 3, 1956 — C. BAUDIN — 2,753,014
LUBRICATION APPARATUS FOR AIR COMPRESSORS
Filed Dec. 24, 1953
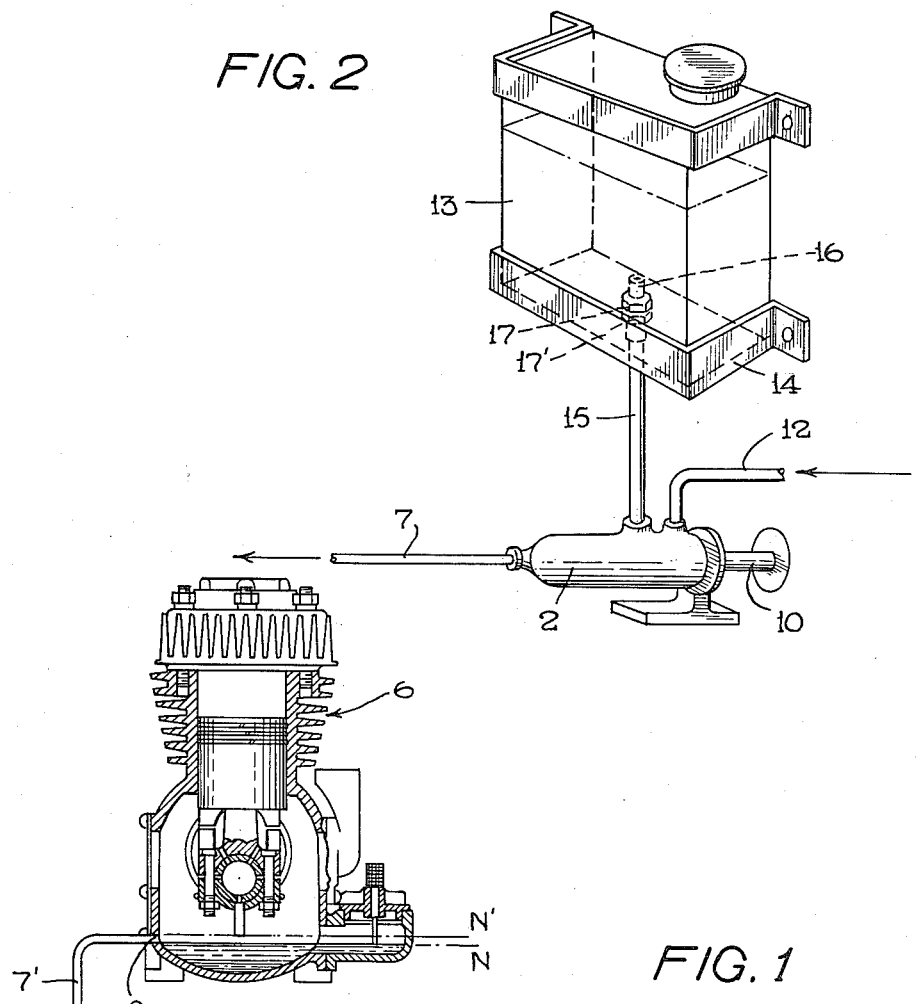
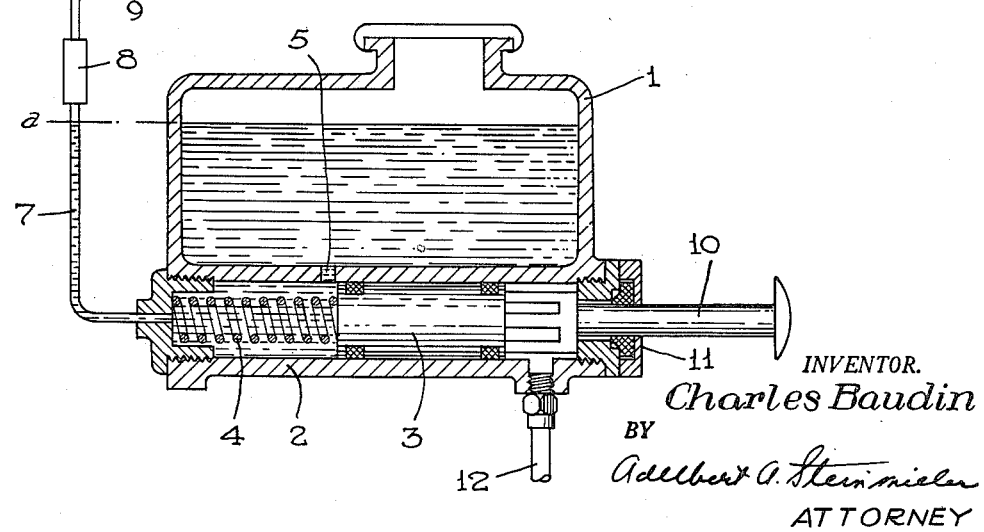
INVENTOR.
Charles Baudin
BY
Adelbert A. Steinmieler
ATTORNEY United States Patent Office 2,753,014
Patented July 3, 1956

2,753,014

LUBRICATION APPARATUS FOR AIR COMPRESSORS

Charles Baudin, Paris, France, assignor to Compagnie des Freins et Signaux Westinghouse, Paris, France Application December 24, 1953, Serial No. 400,332

Claims priority, application France March 14, 1953

3 Claims. (Cl. 184—105)

This invention relates to lubrication apparatus for engines, such as compressors, of the type having a lubricant sump and in particular to apparatus adapted to be operated, either manually or automatically, to check and maintain a desired level of lubricant in the sump of such engine.

It is often difficult, indeed impossible, to insure a convenient charging of lubrication fluid in certain apparatuses and especially of compressors or pumps used on various types of vehicles.

These difficulties arise from: inaccessibility of the apparatus for checking the oil level; impossibility of obtaining lubrication separate from the driving motor when the motor, for instance, is lubricated with a detergent oil while the compressor should be lubricated with a non-detergent oil; and the necessity of major modifications to apparatus or the existing compressor.

The principal object of the present invention is the provision of a system of lubrication of various devices such as compressors which is characterized essentially by a piston which is disposed in a single cylinder of or connected to a reservoir of lubricant, the charging of the apparatus (compressor or other) with lubricating fluid being made by the piston by way of a pipe connecting to the crankcase of the apparatus at a point which corresponds to the normal oil level in the crankcase, the volume of this pipe below the oil level at rest being less than the volume of the chamber of the cylinder at the active side of the piston.

The piston in question can be operated either by a manual means or by a pneumatic system.

This pneumatic operation may be realized by using fluid pressure supplied by a brake valve.

Other characteristics and advantages of the invention will become apparent in the course of the description which follows and by examination of the attached drawing on which is represented, schematically as an example only, two embodiments of the invention.

Fig. 1 is a sectional view of an apparatus, conforming to the invention, for lubricating a compressor, and Fig. 2 is a view in perspective of a variation in which the lubricant reservoir is made up by a commercial drum.

If we consider first of all Fig. 1, we will see that the lubricating apparatus comprises a lubricant reservoir 1 integral with which is the body of a cylinder 2 in which operates a piston 3 which is biased to a position of rest (normal position) by a spring 4.

This reservoir 1 communicates with the cylinder 2 by way of an orifice 5 of large diameter, which orifice may be replaced by several orifices of smaller diameter, if desired.

The cylinder 2 is connected to the crankcase of the compressor 6 by a tube 7—7' on which can be provided a transparent coupling 8 (of plastic material which is known commercially as nylon or other).

The tube 7 ends at orifice 9 in the compressor crankcase 7, the inner end of this orifice determining the normal level of oil in the compressor crankcase. The volume of the tube 7—7' below orifice 9 where it ends in the crankcase of the compressor 6 to point $a$ representing the corresponding level of oil in the reservoir 1 must be, as intended, less than the volume of the chamber in cylinder 2 in which we find the spring 4, in such a fashion that oil may be forced from this chamber by piston 3 to fill all of tube 7—7' and overflow into the crankcase to eventually replenish the oil level therein.

To operate the piston 3, two ways may be provided.

In one way, a manual control may be obtained by means of a push button 10 passing through a leak-tight joint 11 mounted in the end of cylinder 2, and making connection with the piston 3 by any suitable means, such as screw-threads (not shown).

In the other way, an automatic control may be effected by means of a conduit 12 of compressed air fed, for example, by a brake valve (not shown) when the brake valve is operated normally.

The operation of the apparatus is as follows: if the piston 3 is pushed toward the left, either by means of compressed air from pipe 12 supplied by a brake valve (not shown) or by manually forcing the push button 10, the oil contained in the chamber of cylinder 2 in front of piston 3, that is, the chamber in which we find spring 4, will be forced by way of tube 7—7' to the crankcase of compressor 6.

If the crankcase of the compressor is totally empty, it will require several operations to fill it, but this will occur only with new compressors immediately after mounting, the filling of which can be realized by manual operation of the push button 10.

Once the normal level N is attained in the crankcase of the compressor 6, any further operations of the pump 2—3 will only fill the level from N to N'. This level N' will be attained by operation of piston 3, but upon return of the piston to the right under the action of its spring 4, the surplus oil found in the compressor crankcase 6 will flow back by way of the pump and the oil level in the compressor will return to normal.

By the automatic control by way of control of the brakes, each time the brakes are actuated, a small injection of oil is made to the compressor crankcase in a manner to always assure that the level N is well maintained.

The spring 4 can be designed, either to simply return the piston 3 to its position of rest, as when the push button 10 only is employed, or to require a predetermined air pressure of 1, 2 or 3 kgs., for example, to operate the piston to pump oil into the crankcase of the compressor 6.

In the embodiment represented on Fig. 2, we suppose that the cylinder 2 and the reservoir containing the lubricant are separated, this reservoir may consist of a simple commercial oil drum 13, fixed and mounted on a part of the installation or of the vehicle by means of supports 14.

In this installation a tube 15 connects the pump 2 to the bottom of the drum 13 in which an orifice has been fitted, for example, by a tubing fitting 16, threaded externally and maintained in place by means of two nuts 17 and 17' disposed respectively at opposite sides of the bottom of the drum 13.

In this embodiment we find the manual push button 10, the compressed air tube 12 and tube 7—7' which is connected to the crankcase of the machine to be supplied with oil.

It is noted that in its operation, if the same is continued, the apparatus according to the invention regulates automatically the oil level which will not rise above the inlet orifice 9.

In that which precedes, a description was made only of the embodiments shown, and conception can be of other forms which will come within the scope of the invention.

Having now described the invention, what I claim as new and desire to secure by Letters Patent, is:

1. Lubricator apparatus for a device of the type having a sump or crankcase for containing a supply of liquid lubricant therefor, said apparatus comprising a reservoir disposed at a level below that of said crankcase and adapted to contain a supply of liquid lubricant, a cylinder for transferring lubricant from said reservoir to said crankcase, one conduit connecting said reservoir to said cylinder adjacent its one end for permitting gravitational flow of lubricant from said reservoir to said cylinder, another conduit always open and connecting the other end of said cylinder to said crankcase at a point corresponding to the normal intended level of lubricant therein, a piston mounted in said cylinder having a normal position adjacent said one end and adapted to connect said one conduit to said cylinder in said normal position only and upon movement toward said other end to close communication between said one conduit and said cylinder and to force lubricant from said cylinder into said other conduit, the displacement volume of said piston being greater than the volumetric capacity of that portion of said other conduit disposed higher than the level of the liquid lubricant in said reservoir, spring means urging said piston toward its normal position, and means for actuating said piston toward said other end.

2. Lubricator apparatus for a device of the type having a sump or crankcase for containing a supply of liquid lubricant therefor, said apparatus comprising a reservoir disposed at a level below that of said crankcase and adapted to contain a supply of liquid lubricant, a cylinder for transferring lubricant from said reservoir to said crankcase, one conduit connecting said reservoir to said cylinder adjacent its one end for permitting gravitational flow of lubricant from said reservoir to said cylinder, another conduit always open and connecting the other end of said cylinder to said crankcase at a point corresponding to the normal intended level of lubricant therein, a piston mounted in said cylinder having a normal position adjacent said one end and adapted to connect said one conduit to said cylinder in said normal position only and upon movement toward said other end to close communication between said one conduit and said cylinder and to force lubricant from said cylinder into said other conduit, the displacement volume of said piston being greater than the volumetric capacity of that portion of said other conduit disposed higher than the level of the liquid lubricant in said reservoir, spring means urging said piston toward its normal position, fluid pressure responsive means operative automatically in response to fluid under pressure supplied as an incident to the operation of another fluid pressure device to actuate said piston toward said other end.

3. Lubricator apparatus for a device of the type having a sump or crankcase for containing a supply of liquid lubricant therefor, said apparatus comprising a reservoir disposed at a level below that of said crankcase and adapted to contain a supply of liquid lubricant, a cylinder for transferring lubricant from said reservoir to said crankcase, one conduit connecting said reservoir to said cylinder adjacent its one end for permitting gravitational flow of lubricant from said reservoir to said cylinder, another conduit always open and connecting the other end of said cylinder to said crankcase at a point corresponding to the normal intended level of lubricant therein, a piston mounted in said cylinder having a normal position adjacent said one end and adapted to connect said one conduit to said cylinder in said normal position only and upon movement toward said other end to close communication between said one conduit and said cylinder and to force lubricant from said cylinder into said other conduit, the displacement volume of said piston being greater than the volumetric capacity of that portion of said other conduit disposed higher than the level of the liquid lubricant in said reservoir, spring means urging said piston toward its normal position, manually operated means for operating said piston toward said other end of said cylinder to force lubricant into the crankcase of the said device, and fluid pressure responsive means effective upon the supply of fluid under pressure to one side thereof to also operate said piston toward said other end of said cylinder.

References Cited in the file of this patent

FOREIGN PATENTS 591,056     Great Britain _____ Aug. 6, 1947